June 25, 1957 — H. H. PAYZANT — 2,796,897
DRILLING MACHINE

Filed May 9, 1955 — 3 Sheets-Sheet 1

INVENTOR.
HENRY H. PAYZANT
BY
Buckhorn and Cheatham
ATTORNEYS

June 25, 1957     H. H. PAYZANT     2,796,897
DRILLING MACHINE

Filed May 9, 1955     3 Sheets-Sheet 2

INVENTOR.
HENRY H. PAYZANT
BY
Buckhorn and Cheatham
ATTORNEYS

June 25, 1957  H. H. PAYZANT  2,796,897
DRILLING MACHINE

Filed May 9, 1955  3 Sheets-Sheet 3

INVENTOR.
HENRY H. PAYZANT
BY
Buckhorn and Cheatham
ATTORNEYS

United States Patent Office 2,796,897
Patented June 25, 1957

2,796,897

DRILLING MACHINE

Henry H. Payzant, Portland, Oreg., assignor to Timber Structures, Inc., Portland, Oreg., a corporation of Oregon Application May 9, 1955, Serial No. 506,750

3 Claims. (Cl. 144—92)

This invention relates to a drilling machine, and more particularly to a machine which will rapidly drill accurately positioned holes in wooden members as they are being carried in a predetermined path in a direction transversely of their length.

The machine of the present invention has particular utility for drilling dowel holes in boards during their discharge from a scarfing machine in which the ends of the boards are carried transversely past a scarfing cutter by a conveying mechanism, the holes being drilled at the geometrical center of the scarf surface in order to enable dowels to be employed to hold the ends of boards in accurate alignment during the fabrication of large laminated structural members. In the making of large structural members such as beams, arches, columns, etc. from wooden members laminated together, the laminated structural members are, in most cases, very much longer than the available lumber or at least it is not economic to use boards having lengths as great as the desired lengths of the structural members. It is therefore necessary to employ wooden members such as boards or planks arranged in end-to-end relationship in the laminated structures. It is important that the joints between the ends of such members be of as great strength as practicable, particularly in the outer laminations or any of the laminations which are placed under tension in the laminated structural member after being installed. Simple scarf joints in which the ends of the two members to be joined are scarfed or beveled in a single plane and having their scarf surfaces properly glued together are by far the strongest end joints, providing the inclination or slope of the scarf surfaces of the two members is sufficiently small. For best results, the inclination should not be greater than one to twelve. In gluing such scarfed ends of two members together, either before or after incorporating them into a laminated structure, difficulty is encountered in securing accurate registration between the scarf surfaces on the ends of the wooden members during the glue-setting operation. If the ends of the members being glued together are overlapped too far, a thickened joint which interferes with the production of satisfactory laminated structures results and, on the other hand, if the scarfed ends are not overlapped a sufficient amount, a weakened joint and one which is thinner than the remainder of the members results.

The machine of the present invention enables the scarfed ends of the individual boards or members to be drilled to receive a dowel immediately after the scarfing operation and while the ends of the boards are still in alignment with each other and a conveyor mechanism so that the dowel hole is accurately positioned in the same place in each board end. A preferred manner of drilling such holes is to cause a drilling machine to move with the board immediately after it emerges from the scarfing machine and while it is still being moved forward by the conveyor mechanism which carried the board through the scarfing machine. That is to say, it is preferred to employ a drilling machine of the "flying drill" type receiving the boards directly from a continuous scarfing machine. The hole in each scarf surface of the board is drilled in the geometrical center of such scarf surface. In the particular machine shown, the axis of the hole is at an angle to the broad faces of the board. That is to say, it is inclined toward the other end of the board and in a plane through the center line of the board which is perpendicular to the broad faces of the board so as to make an angle, for example, of ten degrees, with a perpendicular to the broad faces of the board, although other angles as well as holes perpendicular to the broad faces of the board may be employed.

The holes for receiving the dowels may, if desired, be drilled all the way through the boards or, alternatively, they can be drilled almost, but not quite, to the opposite surface of the board. In the former case, a dowel may be forced into the drill holes after two boards are positioned with their scarf surfaces in contact or, in both cases, a dowel may be positioned in a hole in one of the ends of the boards so as to have an end extending upwardly from the scarf surface and then the end of another board having a scarf surface and a hole drilled therein placed over the extending end of the dowel. It will be understood, of course, that glue is applied to one or both scarf surfaces prior to assembling the boards as just described. The dowel prevents separation of the boards when they are pulled through a glue-applying machine prior to setting of the glue between such scarf surfaces, the gluing machine referred to being a machine for applying glue to the broad surfaces of the boards as a preliminary step to forming a laminated structure. Also, the dowel holds the scarf surfaces in proper registration during the glue-setting operation either when the glue is set between the scarf surfaces during a separate pressing operation prior to actually placing the joined wooden members in a laminated structure, or when the glue is applied at nearly the same time to all of the surfaces to be glued, including the scarf surfaces. In the latter case, the various members are built up into a laminated structure which is subjected to pressure and the glue on all glued surfaces allowed to set at the same time.

The machine for drilling the dowel holes in accordance with the present invention rapidly and accurately drills the dowel holes at the geometric center of the scarf surfaces. In this connection, the term "geometric center" is intended to mean the geometrical center of a scarf surface which extends from one broad surface of the board to the other. This definition is necessary since the feather edge at the end of the board produced by scarfing is usually trimmed back a fraction of an inch or, alternatively, the scarfing is not carried completely to the end of the board in order to avoid an extremely thin edge. Also, the term "board" is intended to include wooden members of various sizes and is not to be restricted to members of any precise dimension or range of dimensions. The machine referred to drills the holes in the boards while they are being carried sideways by a conveyor mechanism and includes a drilling apparatus mounted on a carriage which travels with the boards, the carriage being moved by the boards during the drilling operation. The position of the drill carried by the drilling mechanism is adjustable relative to the boards both transversely and longitudinally thereof so that the dowel holes can be drilled at the geometrical center of the scarf surfaces on boards of different widths and with scarf surfaces of different inclinations. The drill is set at the desired angle with respect to a perpendicular or may have its axis perpendicular to the broad surfaces of the boards as discussed above.

It is therefore an object of the present invention to provide a machine which will drill accurately positioned holes in the ends of boards while the boards are being moved in a sideways direction along a predetermined path.

Another object of the invention is to provide a machine for drilling accurately positioned holes in the scarfed ends of boards so as to enable such boards to be held together at their ends by dowels to assist in gluing the scarf surfaces of said boards together.

Other objects and advantages of the invention will appear in the following description thereof given in connection with the attached drawing of which:

Figure 1:
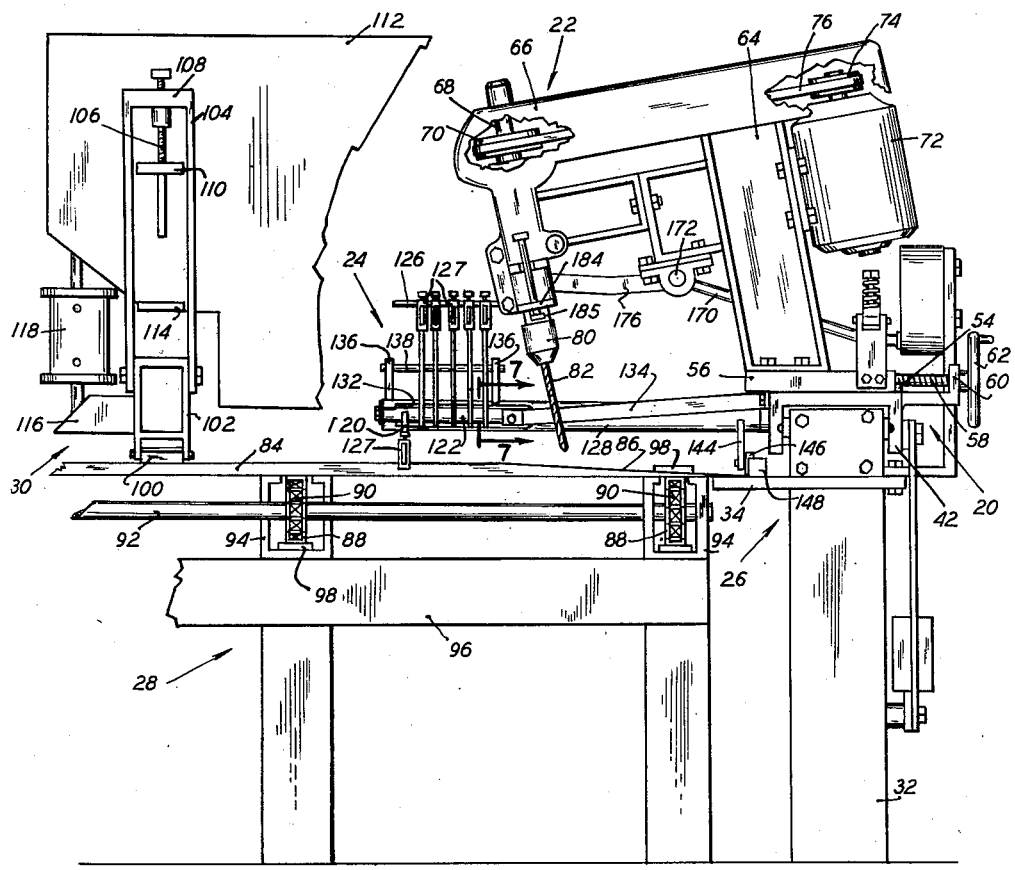
Fig. 1 is a side elevation of the drilling machine of the present invention showing a portion of the conveying mechanism.

Referring more particularly to the drawing, the dowel hole drilling machine specifically illustrated therein includes a carirage indicated generally at 20, a drilling mechanism including a drill head indicated generally at 22 mounted on the carriage 20, and a board-engaging mechanism indicated generally at 24 and also mounted on the carriage mechanism 20. The carriage 20 is mounted for reciprocation on a base structure indicated generally at 26 adjacent a board conveyor structure indicated generally at 28 which carries boards in a sidewise direction past the drilling machine and beneath a hold-down structure indicated generally at 30. The base structure 26 includes a pair of supporting columns 32 and 34 (Fig. 4) supporting a table member 36 which in turn supports a carriage guiding and supporting member 38. The member 38 extends transversely of the drilling machine, i. e., in the direction of travel of the carriage 20, and has in each of its side faces a track in the form of a groove or ball race 40 extending along the length thereof.

The carriage 20 is made up of a pair of channel members 42 and 44 spaced from each other and secured together by a connecting member 46 (Fig. 4), the carriage being made of two pieces merely for ease in fabrication. The channel members 42 and 44 of the carriage open downwardly and loosely fit over the carriage guiding and supporting member 38. The downwardly extending legs of the channel members also have longitudinally extending tracks in the form of grooves or ball races 48 in alignment with the grooves 40 in the carriage guiding and supporting member 38. Steel balls 50 positioned in the grooves 40 and 48 are carried in retainer members 52 and support the channel members 42 and 44 for movement longitudinally of the carriage guiding and supporting member 38. The steel balls and grooves thus form an antifriction mounting for the reciprocable carriage 20.

Figures 3, 4, 5:
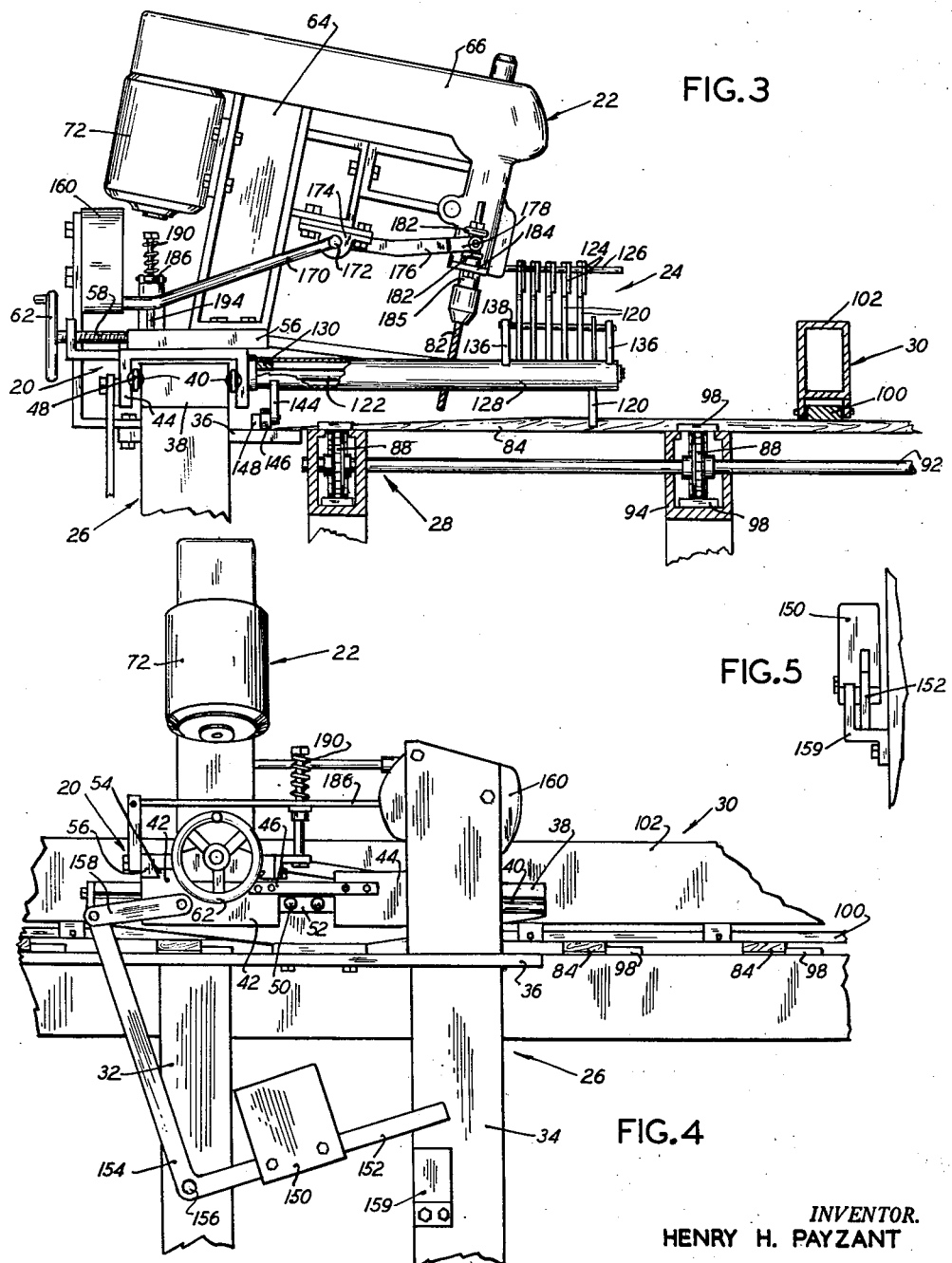
Fig. 3 is a partial side elevation showing the other side of the machine of Fig. 1 showing portions broken away and portions of the conveying mechanism in vertical section.
Fig. 4 is a rear elevation of the machine of Fig. 1 showing a part of the conveying mechanism.
Fig. 5 is a fragmentary side elevation showing a detail of the machine.

The channel member 42 of the carriage 20 supports the head 22 of the drilling machine for sliding motion transversely of the direction of travel of the carriage. That is to say, the channel member 42 has an upstanding dovetail portion 54 received in a dovetail groove in the bottom of a slide member 56. The slide member 56 may be moved transversely of the direction of travel of the carriage by means of a screw 58 journaled in a bracket 60 and secured against endwise movement in said bracket, the screw engaging screw threads in a bore (not shown) in the slide member 56. The screw 58 may be provided with a handwheel 62, and it will be understood that the slide member 56 may be moved transversely of the direction of motion of the carriage 20 by turning the handwheel 62, the screw 58 holding the slide member 56 in adjusted position. The drilling head 22 may be supported by a standard 64 secured to the top surface of the slide member 56, the column 64 being inclined to the vertical, as shown in Figs. 1 and 3. The drilling head may be of conventional design and is secured to the top of the column 64 and has an overhanging end 66 in which a hollow shaft 68 provided with internal splines (not shown) is journaled. A pulley 70 is secured to the shaft 68 and is driven from a motor 72 secured to the column 64 through a pulley 74 on the motor shaft and a belt 76 engaging the pulleys 70 and 74. A drill spindle (not shown) carrying a chuck 80 at its lower end and having an upper splined end received in and driven by the hollow shaft 68 can be reciprocated longitudinally of such shaft to perform a drilling operation by means later described. The chuck 80 receives a drill 82.

Boards 84 emerging from a scarfing machine and having an end 86 scarfed, as shown in Fig. 1, are carried beneath the drill 82 by means of the conveyor structure 28 which includes conveyor chains 88 driven by sprockets 90 secured to a shaft 92 which in turn is driven from any suitable source of power and is journaled in upwardly opening channel members 94 supported on cross members 96. The conveyor chains are positioned within the channel members 94 and have pusher members 98 secured thereto and spaced therealong which ride on the upper edges of the legs of the channel members 94 and push the boards sidewise beneath the drill 82, the boards resting upon the upper surfaces of the legs of the channel members 94. The boards are held down firmly on the upper surface of the channel members 94 by means of a hold-down device which includes a hold-down bar 100 extending parallel to the channel members 94 and supported beneath a rectangular tubular member 102 also extending parallel to the channel members. The tubular member 102 is supported by means of a plurality of inverted U-shaped members 104, only one of which is shown in Fig. 1. The U-shaped member 104 has downwardly extending arms secured to each side of the tubular member 102 and has a screw-threaded member 106 extending through its base portion 108 into contact with the upper surface of a bracket 110 secured to a supporting structure 112 forming part of a scarfing machine (not shown) and overhanging the board conveyor structure 28. The arms of the U-shaped member 104 also engage against the sides of a guide element 114 also secured to the supporting structure 112. The tubular member 102 has a bracket 116 extending laterally therefrom. An air cylinder 118 is positioned between the bracket 116 and the supporting structure 112 and is employed to apply a downward force on the bracket 116 and through such bracket and tubular member 102 to the hold-down bar 100. The hold-down bar 100 is thereby resiliently held in its lower position by the air cylinder, and this position is set by adjusting the screw-threaded member 106.

Figure 7:
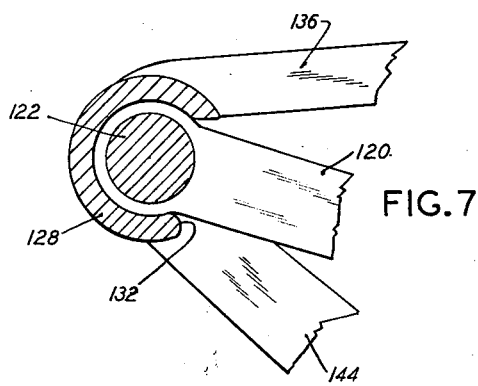
Fig. 7 is a fragmentary vertical section, on an enlarged scale, taken on the line 7—7 of Fig. 1.

As stated above, the drill head 22 and carriage 20 move with the boards 84 while a hole is being drilled in the board. This is accomplished by interposing a board-engaging member carried by the carriage in front of a board 84 so as to cause the carriage and drill head to be moved with the board until the hole has been drilled, after which the board-engaging member is moved from in front of the board so that the carriage can return to its retracted position. The mechanism for engaging a board to cause the carriage to travel therewith includes a plurality of pivoted arms 120 journaled on a stationary shaft 122 (Figs. 7 and 3). The stationary shaft 122 has one end secured to the channel member 44 of the carriage so as to extend therefrom transversely of the direction of motion of the carriage. Each of the arms 120 is provided with a hook member 124 (Fig. 2) which may be engaged over a bar 126 secured to the head 22 and extending generally parallel to the shaft 122. All of the arms 120 may have their hook members 124 engaged over the bar 126 to hold them in an elevated position. When boards are being drilled, a selected one of the arms 120 has its hook disengaged from the bar 124 so that it assumes the lower position shown in Figs. 2 and 6. Each of the arms 120 is employed for boards of a given width and has a board-engaging member 127 adjustably secured adjacent its free end to provide for adjustment longitudinally of its arm 120. The member 127 is positioned to be engaged by the leading edge of a board 84 and, if the board is moving to the right in Fig. 6, the carriage 20 and drill head 22 will be moved with the board since the arms 120 are journaled to the stationary shaft 122 secured to the channel member 44 forming part of the carriage 20.

A hollow shaft or sleeve 128 surrounds the stationary shaft 122. The sleeve 128 has an internal diameter which is greater than the external diameter of the shaft 122 but has its ends journaled on the shaft 122, as indicated at 130 in Fig. 3. The sleeve 128 has a slot 132 in its end remote from the carriage through which the arms 120 pivoted on the stationary shaft 122 extend, the slot 132 also providing an opening for a brace 134 extending between the stationary shaft 122 and the channel member 42 of the carriage. The sleeve 128 also has a pair of spaced, tangentially extending arms 136 secured thereto on opposite sides of the plurality of arms 120 and has a bar 138 extending between the arms 136. Each of the arms 120 has an upstanding portion 140 with a slot 142 with closed upper ends formed therein, the bar 138 extending through the slots 142. It will be apparent that rotation of the sleeve 128 in a counterclockwise direction in Figs. 2 and 6 will cause any arm 120 in the lower position shown in these figures to be lifted by reason of the bar 138 carried by the arms 136 engaging against the upper end of the slot 142, thus lifting such arms 120 thereby lifting its board-engaging element 127 out of engagement with the board 84.

Figure 2:
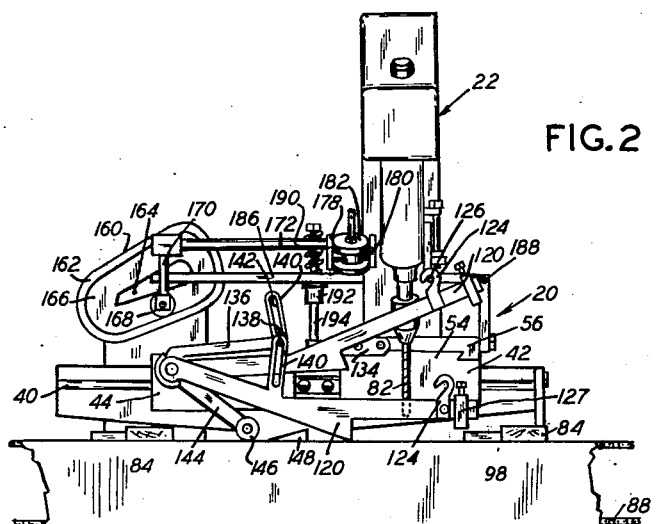
Fig. 2 is a partial front elevation of the machine of Fig. 1 showing boards being drilled in vertical section.

At its end adjacent the channel member 44 of the carriage, the sleeve 128 is provided with another arm 144 extending downwardly at an angle to the direction of motion of the carriage 20 and provided at its free end with a cam follower roller 146 which rolls on the surface of the table member 36 as the carriage moves to the right and left in Fig. 2. An upwardly extending cam member 148 is positioned on the upper surface of the table member 36 (Fig. 3) in the path of the roller 146 so that travel of the roller 146 to the right in Fig. 6 will raise the arm 144 to thereby rotate the sleeve 128 in a counterclockwise direction in Fig. 6. This rotates the arms 136 to lift the arm 120 which is in the lowermost position in Fig. 6 so as to disengage its board-engaging member 127 from the board 84.

Figure 6:
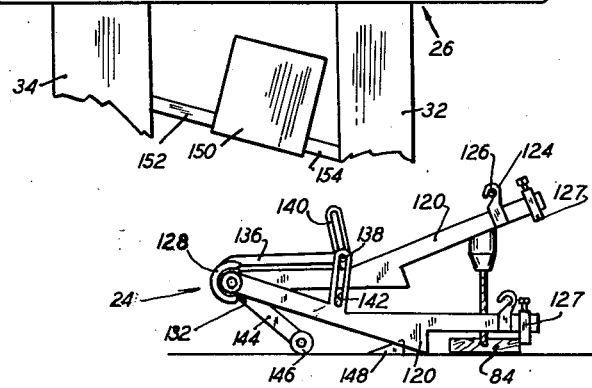
Fig. 6 is a fragmentary front elevation showing the board-engaging mechanism in a different position from that shown in Fig. 2.

It will be noted from Fig. 3 that the roller 146 and cam 148 are out of the path of the ends of the boards 84 but that the pivoted arm 120 which is in the lowermost position has its board-engaging member 127 in the path of the boards 84. In Fig. 2 the carriage 20 is shown in the mid portion of its travel during its return to its left or retracted position. The board 84 passes from left to right and the board at the left of this figure will pass under the arm 120, which is in the lower position, to first raise such arm. The arm referred to will then drop so as to again occupy its lower position. The board-engaging member 127 will then engage the front end of a board, as shown in Fig. 6, and the entire carriage will again be carried to the right by the board 84.

During the travel of the carriage to the right in Fig. 2, the drill 82 is lowered by mechanism described below to drill the dowel hole above referred to and again raised, after which the arm 120 having its board-engaging member 127 engaging the board is raised by reason of the roller 146 being raised by the cam 148 to rotate the arm 120 in a counterclockwise direction about its pivot as previously described. This releases the carriage from the board 84 and the carriage is carried to the right in Fig. 2, i. e., to the left in Fig. 4, by means of a weight 150 slidably adjustable along a horizontally extending arm 152 of a bell crank 154 pivotally mounted at 156 on one of the supporting columns 32, the other arm of the bell crank extending upwardly and being connected to the channel member 42 of the carriage 20 by means of a link 158. It will be apparent that the force of gravity acting upon the weight 150 urges the carriage to the right in Fig. 4. To limit the downward travel of the arm 152, a stop member in the form of a bracket 159 may be secured to the supporting standard 34 so as to be positioned in the path of the end of the arm 152. The bracket 159 thus limits the travel of the carriage 20 to the right in Fig. 4, i. e., to the left in Fig. 2.

As stated above, during the travel of the carriage to the right in Fig. 2 while being moved by a board 84, the drill 82 is lowered to bore a dowel hole in the scarfed portion of such board. This is accomplished by means including a stationary face cam structure 160 secured to the table member 36 and having an outer rim 162 and a central cam member 164 providing a cam groove 166 therein. A cam follower roller 168 is journaled on the free end of an arm 170 forming part of a bell crank, the arm 170 being secured to a shaft 172 journaled in bearings 174 (Figs. 1 and 3) carried by a bracket on the standard 64 which forms part of the drill head 22. Another arm 176 is secured to the shaft 172 and has a yoke 178 (Figs. 2 and 3) at its free end provided with inwardly extending studs 180 which engage between collars 182 secured to a bracket 184 in turn secured to a sleeve 185 (Fig. 1) in which the drill spindle (not shown) carrying the chuck 80 is journaled. The sleeve 185 is mounted for reciprocation in the drill head to raise and lower the chuck 80 carrying the drill 82.

It will be apparent that rotation of the shaft 172 in a clockwise direction in Fig. 3 acting through the arm 176, yoke 178, bracket 184 and sleeve 185 will lower the chuck 80 and drill 82 to perform a drilling operation. Such rotation is produced by the cam structure 160 guiding the cam follower roller 168 during reciprocation of the carriage 20 to the right and left in Fig. 2. In the latter-mentioned figure, the carriage is traveling to the left under the influence of the weight 150 and the cam follower roller 168 is constrained to follow the lower portion of the cam groove 166. This moves the cam follower downwardly to rotate the shaft 172 in a counterclockwise direction in Fig. 3 so that the drill is being raised during the return motion of the carriage. As soon as the cam follower roller 168 clears the left end of the central cam member 164 in Fig. 2, the roller 168 moves upwardly until the arm 170 comes into contact with one end of a spring-pressed bar 186 having its other end pivotally supported at 188 on the slide member 56 of the carriage. The spring-pressed bar 186 extends to the left in Fig. 2 in the direction of travel of the carriage and has its free end urged downwardly by a spring 190 against a stop 192, both the spring 190 and the stop 192 being carried on an upstanding stud also secured to the slide member 56 of the carriage. The spring-pressed bar 186 has its free end overhanging the arm 170 carrying the cam follower roller 168 and resiliently limits upward movement of the end of the arm 170 carrying the roller 168. The upward movement of such end of arm 170 lowers the drill into position where it still clears the boards but is in readiness for a drilling operation. The upward movement of the end of the arm 170 carrying the roller 168 is produced by the weight of the drill spindle, chuck 80 and sleeve 185, the usual return spring for such drill spindle and sleeve being removed or, if desired, reversed in direction to aid in lowering of the drill spindle, sleeve 185 and chuck 80.

When the cam follower roller 168 clears the left end of the cam member 164 and moves upwardly so that the arm 170 engages the spring-pressed bar 186, the cam follower roller 168 is then in position to follow the upper surface of the cam member 164 upon movement of the carriage to the right in Fig. 2. As the carriage is carried along by a board 84, the cam member 164 continues to raise the cam follower roller 168 to lower the drill 82. This causes a dowel hole to be drilled in the board. Movement of the cam follower roller 168 up the upper surface of the cam member 164, also causes the arm 170 to engage the spring-pressed bar 186 and raise its free end against the compressive stress of the spring 190. As soon as the cam follower roller clears the right end of the cam member 164, the end of the arm 170 carrying the cam follower roller 168 is abruptly moved downwardly by the spring-pressed bar 186 to withdraw the drill from the board and position the roller 168 to follow the lower surface of cam member 164. Shortly after this occurs the cam 148 on the table member 36, acting through the cam follower 146 (Fig. 2), raises the arm 120, which has its board-engaging member in contact with a board 84, to release the carriage from the board 84, and the weight 150 again returns the carriage to the left in Fig. 2, the cam follower roller 168 again following the lower surface of the cam member 164.

The cam groove 166 is of sufficient depth that the slide member 56 can be moved to the right in Fig. 3 a substantial distance in order to adjust the position of the drill 82 longitudinally of the board 84 without withdrawing the cam follower roller from the cam groove of the face cam structure 160. The carirage 20 carrying the drill head 22 thus moves with the boards 84 and holes are drilled in the boards as long as boards are fed beneath the drilling machine. The board-engaging members 127 on the arms 120 may be set for various board widths, and the only adjustment then necessary when boards of different widths are fed beneath the drilling machine is to unhook the appropriate arm 120 from the support bar 126 and hook thereto any arm 120 that previously occupied a position to have its adjustable board-engaging member 127 in engagement with the front end of a board.

The operation of the machine thus far described is believed to be apparent from the above description thereof. Boards from a scarfing machine are held down by the bar 100 while they are being carried by the pusher members 98 on the conveyor chains 88 in accurate alignment under the drilling machine of the present invention. The carriage is normally held in its left position in Fig. 2, i. e., its retracted position, by the weight 150 acting through the bell crank 154 and link 158 until the board-engaging member 127 on an arm 120 is engaged by the front edge of a board 84. A board traveling to the right in Fig. 2 carries the entire carriage 20 with its drill head 22 with the board and during this time the cam follower roller 168 rides up the upper surface of the cam member 164 to lower the drill 82. A hole is drilled in the geometrical center of the scarf surface of the board, as explained above, and as soon as the cam follower roller 168 clears the right end of the cam member 164, the drill 82 is withdrawn from the board. Shortly thereafter the cam follower roller 146 on the arm 144 rides up the cam 148 on the table member 36 to raise the board-engaging member 127 carried by the arm 120 to release the carriage from a board 84. The weight 150 then returns the carriage to the left in Fig. 2, the cam follower roller 168 being moved down by the spring-pressed bar 186 acting on the bell crank arm 170 so that such roller follows the lower surface of the cam member 164 during return of the cariage. The appropriate arm 120 for boards of different widths may be employed by unhooking such arm from the bar 26, leaving the other arms 120 hooked to the bar 126. Also, as explained above, the drill 82 may be set to drill a hole which does not quite penetrate the opposite surface of the board or, alternatively, can be set to drill entirely through the board. While specific apparatus has been described for causing the carriage and drilling mechanism mounted thereon to move with the board and for producing reciprocation of the drill during the drilling operation, it is apparent that other operative apparatus may be employed.

Figure 9:
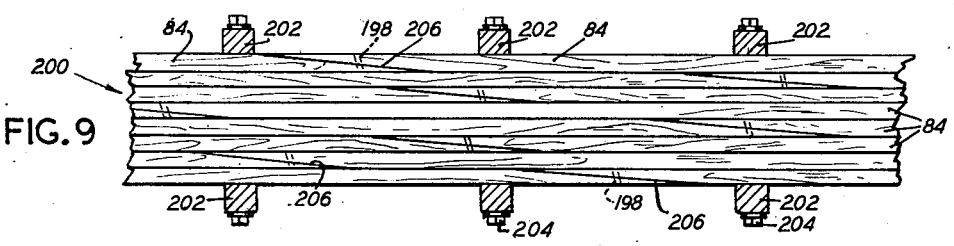
Fig. 9 is a vertical section taken on the line 9—9 of Fig. 8.
Figure 8:
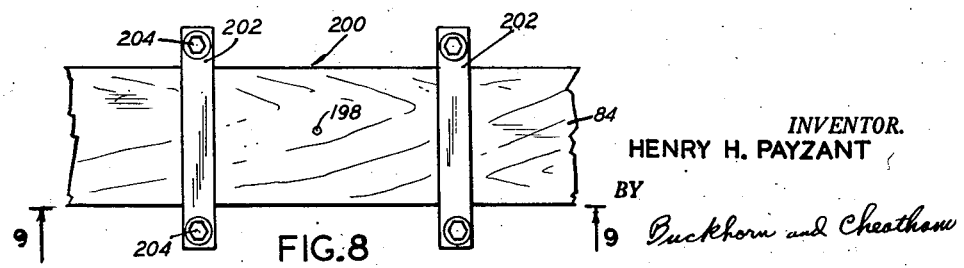
Fig. 8 is a plan view of a portion of a laminated structure showing the gluing clamps in position.

As stated above, a dowel can be positioned in the holes drilled in the scarfed ends of two boards when the scarf surfaces thereof are brought into register with each other. A plurality of such dowels in position in the drilled holes are indicated at 198 in Fig. 9. This figure as well as Fig. 8 shows a laminated structure or laminate, indicated generally at 200, including a plurality of boards joined together by the dowels 198. During the gluing operation such a laminated structure is held together under pressure by clamps such as those provided by clamping members 202 and bolts 204. The laminated structure may be assembled in various ways. For example, the scarf joints 206 may be completely made before the various boards are assembled into the laminate 200. That is to say, glue can be applied to one or both of the scarf surfaces of various pairs of boards and the joints completed by setting the glue therein before incorporating the joined wooden members into the laminated structure 200. Alternatively, glue may be applied to the scarf surfaces and this glue set at the same time that the glue between the various laminations is set. In any event, the dowels 198 act as positioning elements so that the scarf surfaces of the boards remain in accurate alignment longitudinally of the boards during the glue-setting operation.

I claim as my invention:

1. A machine for drilling holes in boards while they are spaced laterally from each other and are being carried along a predetermined path in a direction transverse to their length, said machine comprising a carriage supported at one side of said path of said boards for reciprocation in a direction parallel to said path, means urging said carriage in a direction opposite to the direction of travel of said boards, board-engaging means mounted on said carriage and overhanging the ends of said boards for causing said carriage to travel with one of said boards, drilling mechanism mounted on said carriage and also overhanging the ends of said boards, a drill carried by said mechanism and mounted for rotation and for reciprocation, means for rotating said drill, means for reciprocating said drill while said carriage is being moved with said one board to cause said drill to drill a hole in said one board and then be withdrawn, said board-engaging means including a stationary shaft overhanging the ends of said boards and a plurality of arms pivoted on said shaft and extending in the direction of travel of said boards, each of said arms having a board-engaging member thereon for engaging a board of selected width in order to drill a hole in a desired position therein, means to support all of said arms so that their board-engaging members are out of the path of travel of said boards and to provide for positioning the board-engaging member of a selected one of said arms in the path of travel of said boards, and means operating after the withdrawal of said drill to pivot said selected arm to disengage the board-engaging member thereof from said one board to enable said urging means to return said carriage so that said board-engaging means can cause it to travel with another board.

2. A machine for drilling holes in boards while they are laterally spaced from each other and are being carried in a predetermined path in a direction transverse to their length, said machine comprising a support, a carriage mounted for reciprocation in a direction parallel to said path, means urging said carriage in a direction opposite to the direction of travel of said boards, board-engaging means secured to said carriage for engaging the leading edge of one of said boards to cause said carriage to travel with said one board, drilling mechanism mounted on said carriage, a drill carried by said mechanism and mounted for rotation and for reciprocation, means for rotating said drill, means including a stationary face cam on said support and a cam follower movably mounted on said carriage for reciprocating said drill while said carriage is being moved with said one board to cause said drill to drill a hole in said one board and then be withdrawn, and means thereafter disengaging said board-engaging means from said one board to enable said urging means to return said carriage so that it can travel with a succeeding board.

3. A machine for drilling holes in boards while they are spaced laterally from each other and are being carried along a predetermined path in a direction transverse to their length, said machine comprising a carriage supported for reciprocation parallel to the said path, means for moving said carriage with one of said boards while maintaining said carriage in a predetermined position with respect to said one board, a drill head mounted on said carriage, a drill spindle for receiving a drill and journaled for rotation in said head, said spindle being mounted for reciprocation in said head, means to rotate said spindle, a stationary face cam mounted adjacent said carriage and having a central cam member surrounded by a cam groove, a cam follower movably mounted on said carriage and connected with said spindle, said cam follower being positioned in said cam groove in contact with said cam member so as to contact one side of said cam member during travel of said carriage with said one board and be cammed thereby in a direction to cause said spindle to project said drill to drill a hole in said one board and then be withdrawn, means to thereafter disengage said board-engaging means from said board to enable said carriage to return so that its board-engaging means can cause it to travel with another board, and spring-pressed means to cause said cam follower to engage the other side of said cam member during the return motion of said carriage so as to maintain said drill in withdrawn position.

References Cited in the file of this patent

UNITED STATES PATENTS

| | | |
|---|---|---|
| 487,407 | Gould | Dec. 6, 1892 |
| 528,307 | Schulz | Oct. 30, 1894 |
| 1,195,852 | Purdy | Aug. 22, 1916 |
| 2,407,070 | Frame | Sept. 3, 1946 |